United States Patent
Miller et al.

(10) Patent No.: US 6,565,167 B1
(45) Date of Patent: May 20, 2003

(54) REMOVABLE COMPUTER CORE WITH RETRACTABLE HANDLE MECHANISM

(75) Inventors: Wayne Miller, Los Altos, CA (US); Steve Holmes, Mountain View, CA (US); Matt Rohrbach, San Francisco, CA (US); Rick Mariano, Hayward, CA (US); Sung Kim, Palo Alto, CA (US); Perry Anderson, Berkeley, CA (US); Eric Knopf, Mountain View, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/899,541

(22) Filed: Jul. 6, 2001

(51) Int. Cl.⁷ .............................................. A47B 88/00
(52) U.S. Cl. ................ 312/332.1; 361/687; 312/223.2; 312/215; 312/244
(58) Field of Search ............................. 312/332.1, 215, 312/222, 244, 242, 272, 272.5, 295, 312, 333, 223.2, 334.8; 74/575, 111, 577 R, 577 M, 578; 403/322.1, 324, 325, 328, 330; 211/169.1; 248/222.11, 292.12, 222.51; 292/85, 359, DIG. 30, 31, 49; 361/683–686, 725–727, 730, 732, 740–741, 796, 687, 690, 801, 807; 16/110.1

(56) References Cited

U.S. PATENT DOCUMENTS

| | | | | |
|---|---|---|---|---|
| 3,039,837 A | * | 6/1962 | Poe ............................ | 292/241 |
| 3,866,270 A | * | 2/1975 | Suzuki et al. .................. | 16/324 |
| 4,834,112 A | * | 5/1989 | Machek et al. ................ | 33/514 |
| 4,977,795 A | * | 12/1990 | McVey ......................... | 188/69 |
| 5,375,481 A | * | 12/1994 | Cabrera et al. ........... | 248/316.4 |
| 5,557,499 A | * | 9/1996 | Reiter et al. ............. | 312/223.2 |
| 5,586,003 A | * | 12/1996 | Schmitt et al. ........... | 312/332.1 |
| 6,049,451 A | * | 4/2000 | Schmitt et al. ............. | 312/216 |
| 6,064,574 A | * | 5/2000 | Yu et al. ..................... | 165/121 |
| 6,172,880 B1 | * | 1/2001 | Petitpierre et al. .......... | 361/752 |
| 6,203,076 B1 | * | 3/2001 | Wytcherley et al. ........ | 292/197 |
| 6,231,145 B1 | * | 5/2001 | Liu .......................... | 312/223.2 |
| 6,270,174 B1 | * | 8/2001 | Nishi ....................... | 312/223.1 |
| 6,301,099 B1 | * | 10/2001 | Felcman et al. .......... | 312/332.1 |
| 6,351,379 B1 | * | 2/2002 | Cheng ...................... | 312/332.1 |
| 6,356,441 B1 | * | 3/2002 | Claprood ................. | 312/332.1 |
| 6,373,698 B1 | * | 4/2002 | Christensen ............... | 174/16.1 |
| 6,373,713 B1 | * | 4/2002 | Jensen et al. ............ | 211/41.17 |
| 6,421,236 B1 | * | 7/2002 | Montoya et al. ........... | 361/685 |

* cited by examiner

*Primary Examiner*—Daniel P. Stodola
*Assistant Examiner*—Jennifer E. Novosad
(74) *Attorney, Agent, or Firm*—Burns, Doane, Swecker & Mathis, L.L.P.

(57) ABSTRACT

A computer system comprising a casing enclosing a computer core unit and a latching system including a handle mechanism for removably securing the computer core unit within the casing; wherein the handle mechanism is configured in a first position for securing the core unit into the casing and in a second position for removing the core unit from the casing.

15 Claims, 11 Drawing Sheets

REMOVABLE COMPUTER CORE WITH RETRACTABLE HANDLE MECHANISM

BACKGROUND OF THE INVENTION

1. Field of the Invention

The present invention relates generally to hardware for computer systems, and more specifically, to a computer core which is easily removable from an outer casing via actuation of a retractable handle mechanism.

2. Description of the Related Art

Computer systems typically include a core which is composed of a combination of many components. These components may include a microprocessor, a hard drive, disk drives, a heat removal system, a power source, and various other elements. Components of a computer system are typically grouped together in a common housing or casing. A casing is useful to store and protect the components of the computer system. Casings also make the computer system easily transportable.

Traditional casings are made up of panels which are secured together with screws. This serves to protect the computer, however, it is exceedingly difficult to access the components within the casing. It may be necessary or desirable to access a certain component within the casing in order to service, replace or upgrade it. Disassembling the casing, however, is time consuming and requires using appropriate tools. Computer owners are often unwilling to service their own computers because of these difficulties and are forced to call on professionals to make simple repairs and upgrades.

There therefore remains a need in the art to provide a computer system that allows simplified and expedited access to the core components of the computer system for periodic servicing and that securely stores and protects the components during general use.

SUMMARY OF THE INVENTION

According to an exemplary embodiment of the invention, a computer system comprises a casing enclosing a computer core unit; and a latching system including a handle mechanism for removably securing said computer core unit within said casing; wherein said handle mechanism is configured in a first position for securing said core unit into said casing and in a second position for removing said core unit from said casing.

Still other objects, features, and attendant advantages of the present invention will become apparent to those skilled in the art from a reading of the following detailed description of embodiments constructed in accordance therewith, taken in conjunction with the accompanying drawings.

BRIEF DESCRIPTION OF THE DRAWINGS

The invention of the present application will now be described in more detail with reference to preferred embodiments of the apparatus, given only by way of example, and with reference to the accompanying drawings, in which.

DESCRIPTION OF THE PREFERRED EMBODIMENTS

Referring to the drawing figures, like reference numerals designate identical or corresponding elements throughout the several figures.

FIGS. 1A–1E illustrate the installation and removal of a computer core 14 into a computer system 10 in accordance with the present invention.

Preferably, the computer system 10 comprises a casing 12 adapted to enclose a computer core unit 14 and a latching system 16 including a handle mechanism 18 for removably securing the computer core unit 14 within the casing 12. The handle mechanism 18 is preferably configured in a first position for securing the core unit 14 into the casing 12 and in a second position for removing the core unit 14 from the casing 12.

Figure 1A:
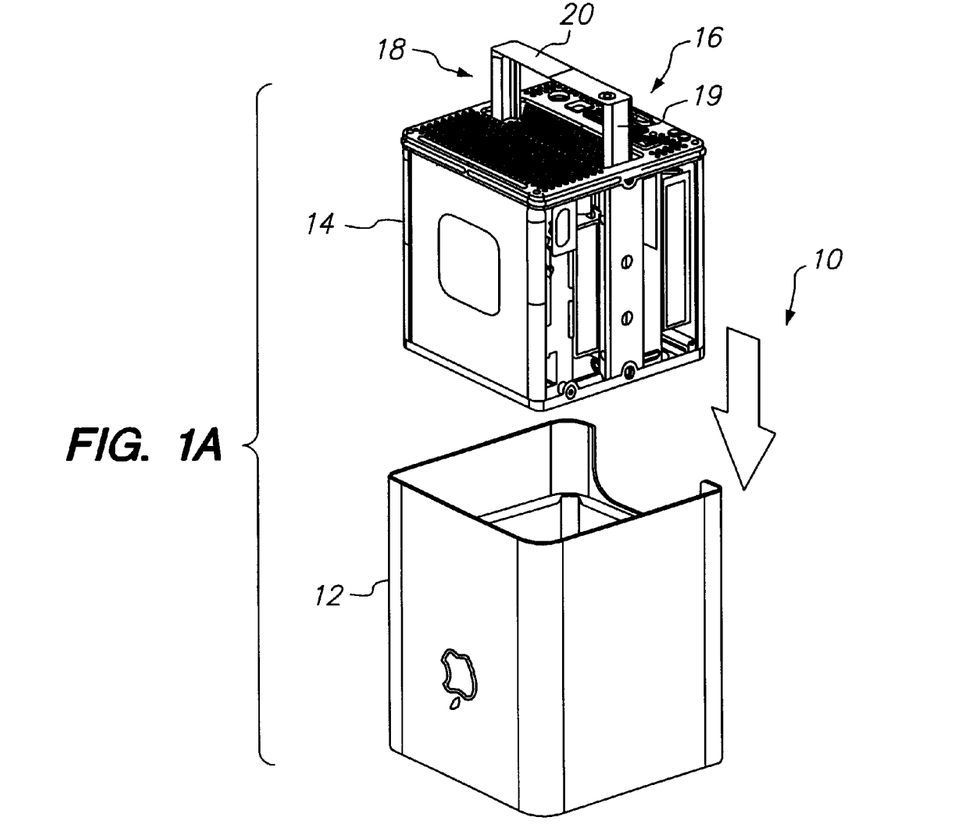
FIG. 1A is an exploded view of the computer system according to the present invention.
Figure 1B:
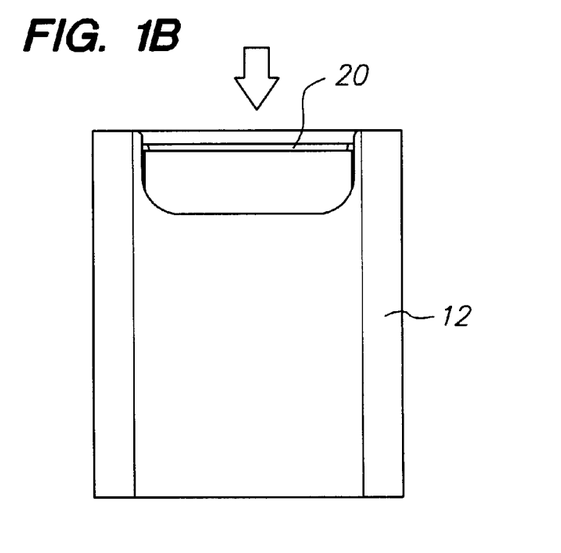
FIGS. 1B–1E are schematic views thereof.

As shown in FIGS. 1A and 1B, to install the computer core unit 14 into the casing 12, the computer core unit 14 is lifted by the handle mechanism 18 and gently placed into its position within the casing 12. The handle mechanism 18 is then preferably pressed down into the computer core unit 14 until the latching system 16 secures the computer core unit 14 to the casing 12. The handle mechanism 18 is preferably integrated into the computer system such that when it is not used to lift the computer core unit 14, it is stored generally flush with an exterior surface of the computer core unit 14 and the casing 12. With the handle mechanism 18 hidden away, the computer core unit 14 is securely fastened to the casing 12.

Figure 1C:
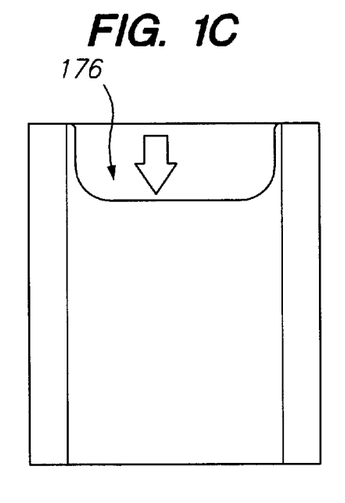
Figure 1D:
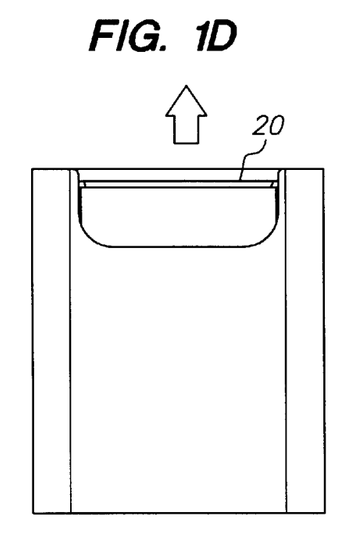
Figure 1E:
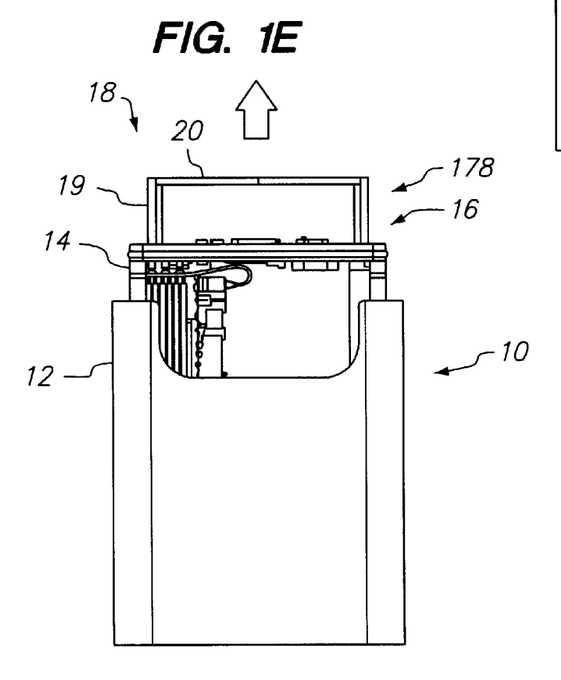

Referring to FIGS. 1C–1E, to remove the computer core unit 14 from the casing 12, the hand grip 20 of the handle mechanism 18 is pressed toward the computer core unit 14, in the direction of the arrow shown in FIG. 1C. Pressing the hand grip 20 releases the latching system 16 and the handle mechanism 18, including the hand grip 20, automatically rises out of the computer core unit 14 with a controlled dampened movement (FIG. 1D). Once the handle mechanism 18 is extended out of the computer core unit 14, it is used to lift and remove the computer core unit 14 out of the casing 12 (FIG. 1E).

The computer core unit 14 preferably houses the electronic components of the computer system. Removing the computer core unit 14 allows for complete access to disk drives, memory, and other customer and manufacturer serviceable items inside of the computer.

Figure 2A:
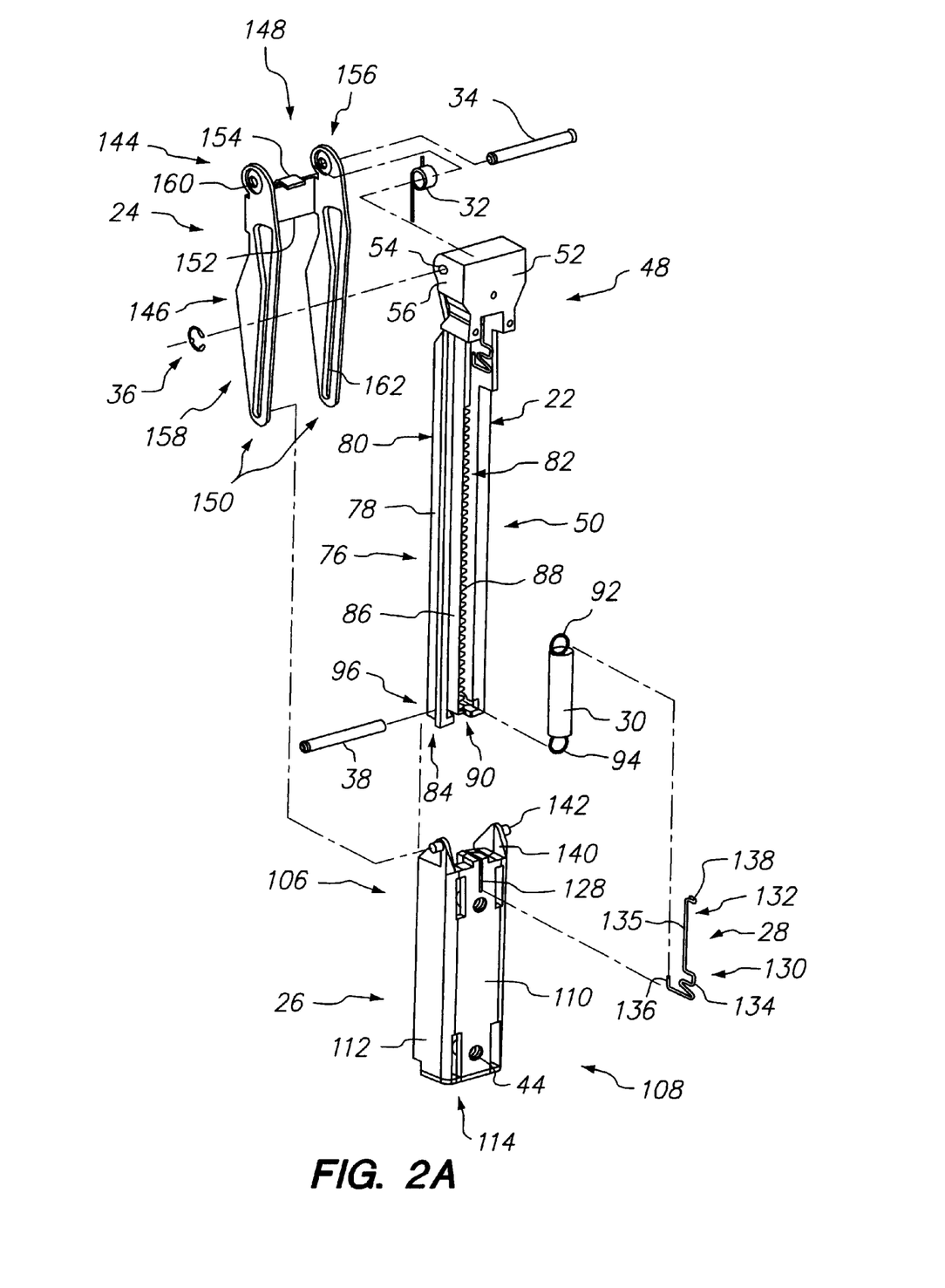
FIG. 2A is an exploded, perspective view of a portion of a latching system according to the present invention.
Figure 2B:
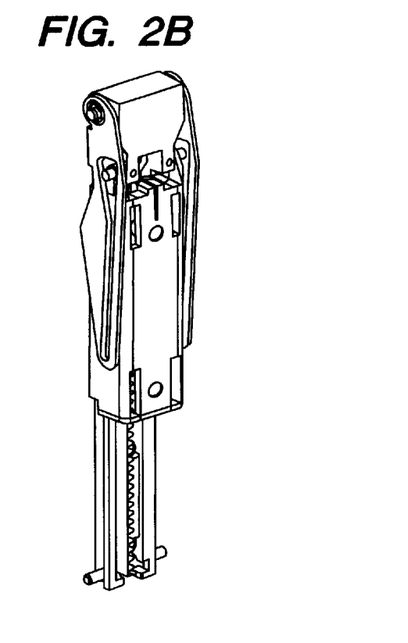
FIGS. 2B and 2C are perspective views thereof.
Figure 2C:
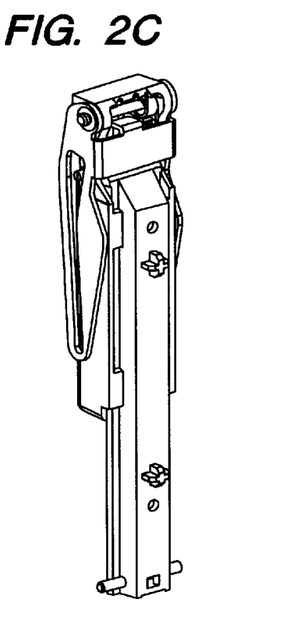

Referring to FIGS. 2A–2C, in one embodiment of the invention, the latching system 16 preferably includes a latch rail 22, a latch pawl 24, a latch slider assembly 26, and the handle mechanism 18. The latching system 16 also preferably includes a latch wireform 28, a latch extension spring 30, a latch torsion spring 32, a pivot pin 34, an E-clip 36, and a slider pin 38. Additionally, the latching system 16 preferably includes a latch damper 40, a latch damper gear 42, and brass inserts 44, as discussed further below. The latching system 16 is preferably located within the core unit 14 and preferably interfaces with a latch bracket 46 on the casing 12.

As shown in FIG. 2A, the latch rail 22 preferably has a first end portion 48 and a second end portion 50. The first end portion 48 of the latch rail 22 preferably has a housing 52 designed to support the latch pawl 24. The housing 52 preferably has two aligned openings 54, located on opposing sides 56 of the housing 52. The aligned openings 54 are preferably designed to hold the pivot pin 34 which preferably attaches the latch torsion spring 32 and the latch pawl 24 to the latch rail 22.

Figure 3:
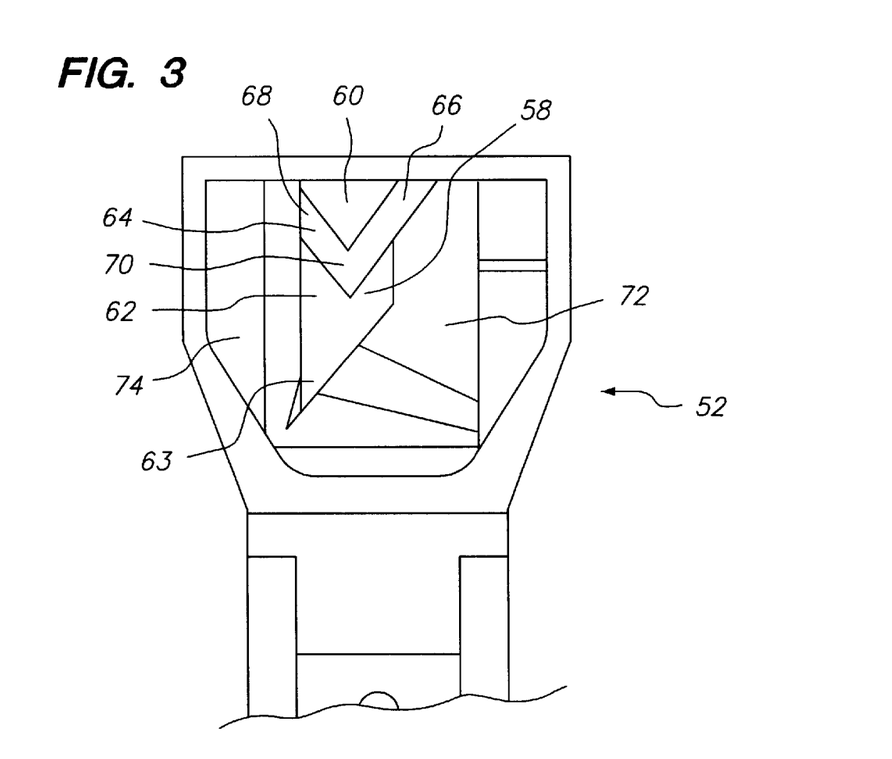
FIG. 3 is a detailed view of one element in the latching system of FIG. 2.

The housing 52 of the first end portion 48 also preferably accepts and holds the latch wireform 28 in the latched position. As shown in FIG. 3, the housing 52 preferably has a generally heart-shaped holding element 58 to hold the latch wireform 28 in the locked position. The heart-shaped holding element 58 is preferably a raised portion on the inside of the housing 52. There is preferably a raised triangular-shaped wedge 60 situated above, and generally aligned with, the upper portion 62 of the heart-shaped holding element 58, the wedge 60 and the holding element 58 are preferably separated by a V-shaped groove 64. The upper portions 66, 68 of the V-shaped groove 64 are preferably raised slightly more than the lower portion 70 of the V-shaped groove 64.

The housing 52 is preferably designed to manipulate the latch wireform 28 along a path into a locked position, or out of the locked position, as the latch wireform 28 is pressed into the housing 52. The portion of the housing 52 on a first side 72 of the heart-shaped holding element 58 gradually rises toward the upper portion 62 of the heart-shaped holding element 58 where it drops off at a first upper portion 66 of the V-shaped groove 64. The portion of the housing 52 on a second side 74 of the heart-shaped holding element 58 is not raised higher than the second upper portion 68 of the V-shaped groove 64.

As the latch wireform 28 is inserted into the housing 52, it preferably travels on the first side 72 of the heart-shaped holding element 58, following the shape of the lower portion 63 of the heart-shaped holding element. The latch wireform 28 is preferably pressed into the housing 52 until an end portion 138 of the latch wireform 28 falls into the first upper portion 66 of the V-shaped groove 64. The latch wireform 28 is preferably pulled into the lower portion 70 of the V-shaped groove 64 by the latch extension spring 30. The latch wireform 28, and handle mechanism 18, are preferably held in a latched position.

To release the handle mechanism 18, and the latch, the hand grip 20 is preferably pushed in slightly, preferably causing the latch wireform 28 to be pressed up against the triangular-shaped wedge 60, which preferably directs the latch wireform 28 toward the second upper portion 68 of the V-shaped groove 64. The latch wireform 28 is preferably pressed to the end of the second upper portion 68 of the V-shaped groove 64 where it falls out of the V-shaped groove 64 onto the portion of the housing 52 on the second side 74 of the heart-shaped holding element 58. The latch wireform 28 is preferably pulled by the latch extension spring 30 along the lower portion 63 of the heart-shaped holding element 58, and out of the housing 52 of the latch rail 22.

As shown in FIG. 2A, the second end portion 50 of the latch rail 22 preferably has a shaft 76 designed to interface with the latch slider assembly 26. The latch slider assembly 26 preferably slides along the shaft 76. The shaft 76 preferably has two side portions 78 and a back portion 80. These three portions 78, 80 are preferably configured to form an open center column 82. Each side portion 78 of the shaft 76 preferably has a rail 84 that extends along the length of the shaft 76 outside the open center column 82. These rails 84 are preferably compatible with rail slots 118 (FIG. 5) in latch slider assembly 26.

There is preferably a track 86 along the length of the shaft 76. The track 86 preferably extends from one of the side portions 78 of the shaft 76 in the direction opposite the back portion 80 of the shaft 76. The track 86 is preferably designed to interface the latch slider assembly 26, and specifically, the latch damper gear 42 (FIG. 5) of the latch slider assembly 26. The track 86 preferably has gear teeth 88 on the side of the track 86 nearer the open center column 82 of the shaft 76.

The latch rail 22 preferably has a rail hook 90 extending from the back portion 80 of the shaft into the open center column 82 of the shaft 76. The rail hook 90 is located near an end of the shaft 76 opposite the housing 52. The rail hook 90 preferably extends into the open center column 82, with a portion of the rail hook 90 extending away from the housing 52, so that a first end loop 92 of the latch extension spring 30 can be held in place by the rail hook 90.

Figure 4A:
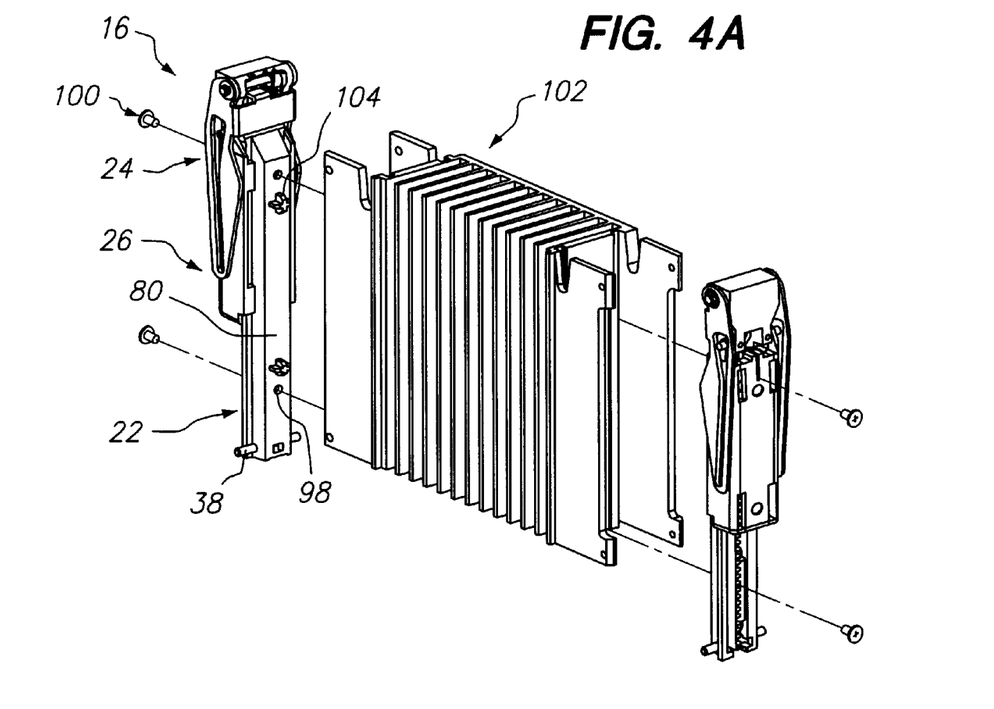
FIG. 4A is an exploded, perspective view of a portion of a latching system and a support structure, and 4B is a perspective view thereof.
Figure 4B:
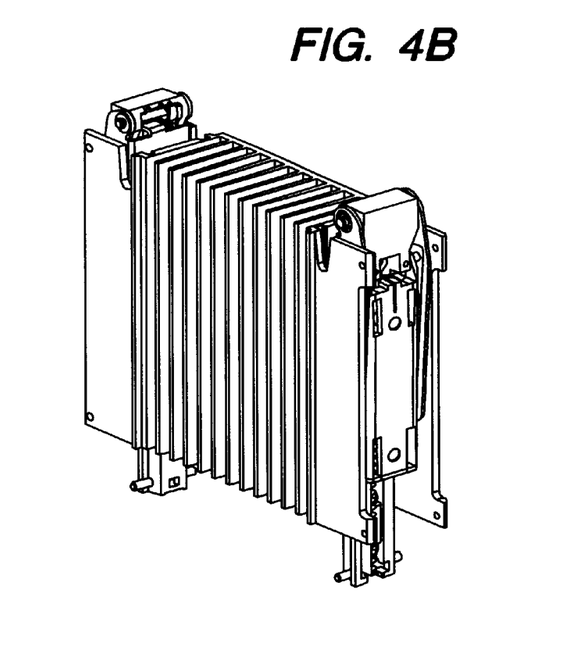

As illustrated in FIGS. 2A and 4A, the shaft 76 of the latch rail 22 preferably has several openings 96, 98. There are preferably two aligned openings 96, one on each side portion 78 of the shaft 76, located near the rail hook 90, which are preferably designed to hold the slider pin 38. Additionally, there are preferably two additional openings 98 in the back portion 80 of the shaft 76. These openings 98 are preferably designed to allow the latch rail 22, and latching system 16, to be attached with screws 100 to a structure 102 within the core unit 14 of the computer 10. Additionally, the shaft 76 of the latch rail 22 preferably has two spacers 104 extending from the back portion 80 of the shaft 76 to separate the latch rail 22 assembly from the structure 102 that it is attached to within the core unit 14 of the computer 10. The spacers 104 preferably allow the latch pawl 24 to pivot into the space between the back portion 80 of the shaft 76 and the structure 102 to which the latch rail 22 is attached. The latch rail 22 is preferably made of plastic, although other materials could, of course, also be used.

Figure 5:
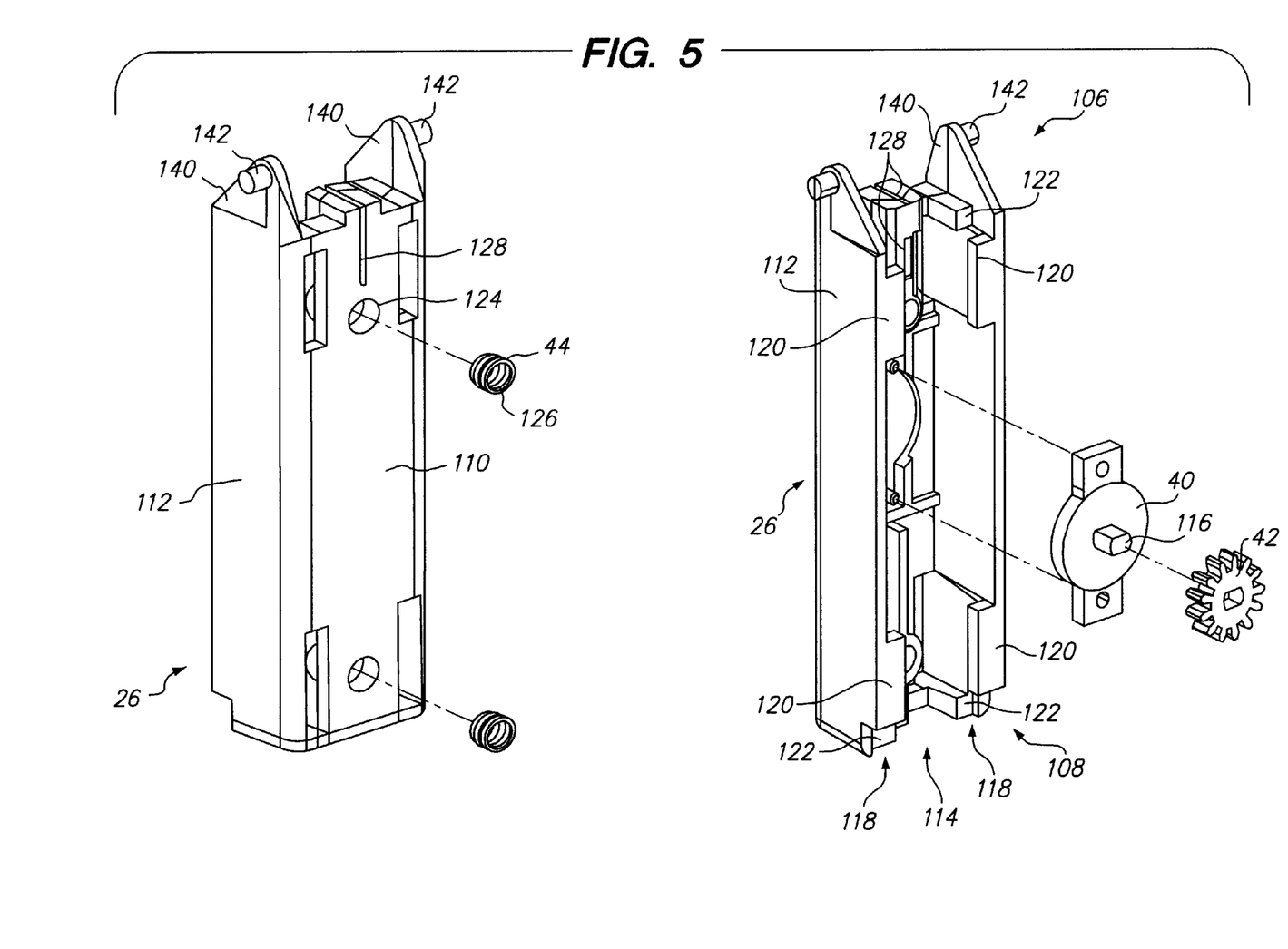
FIG. 5 is an exploded, perspective view of another element in the latching system of FIG. 2.
Figure 6A:
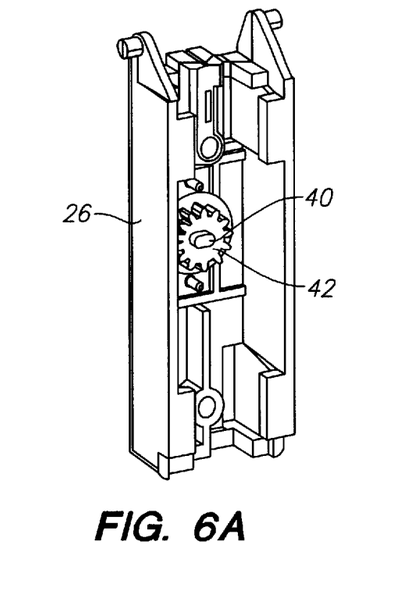
FIGS. 6A–6F illustrate the latching system of the present invention.
Figure 6B:
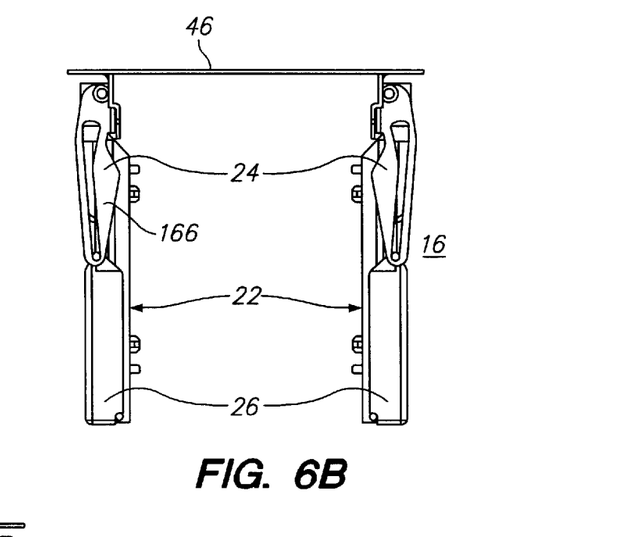
Figure 6C:
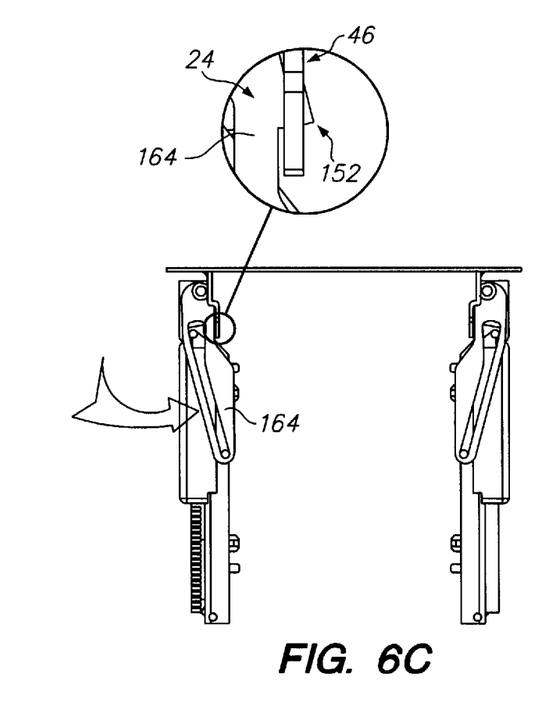
Figure 6D:
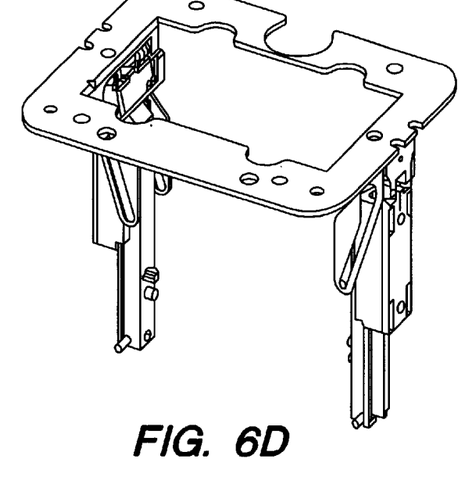
Figure 6E:
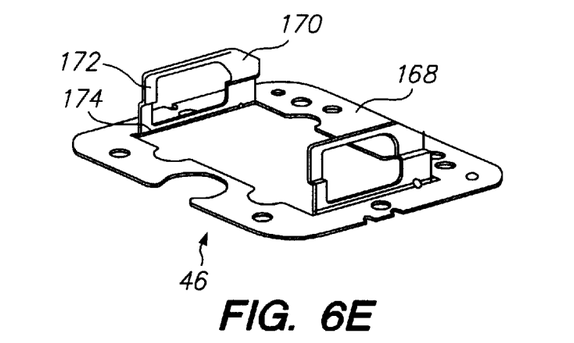
Figure 6F:
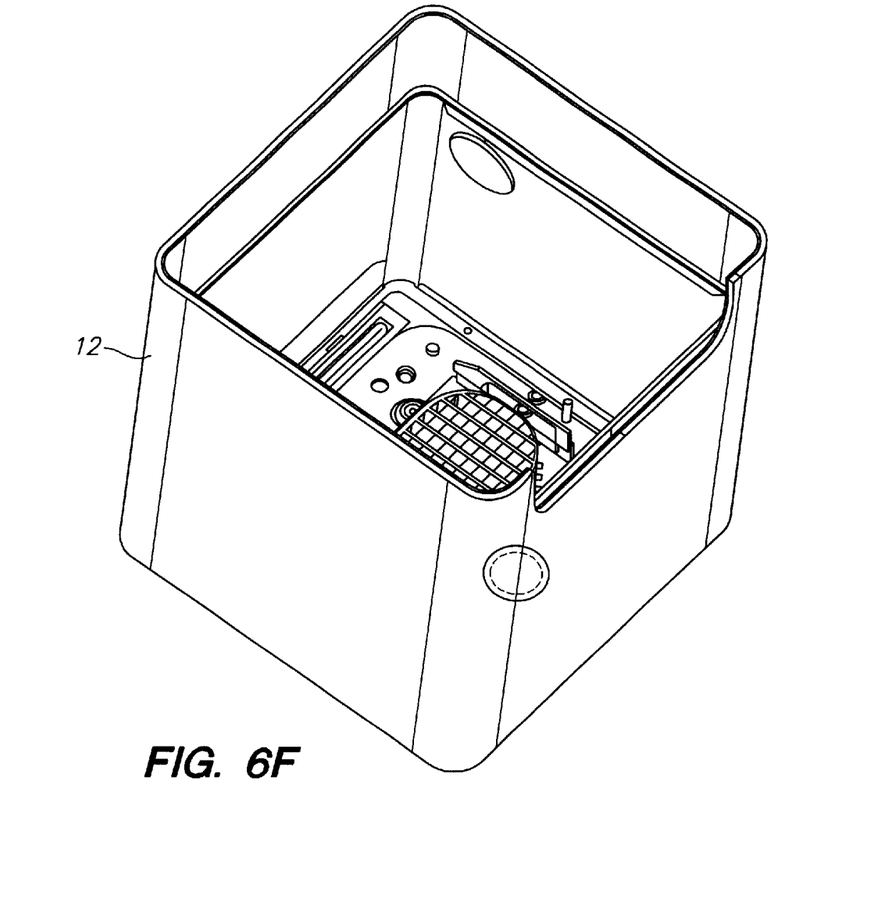
Figure 7A:
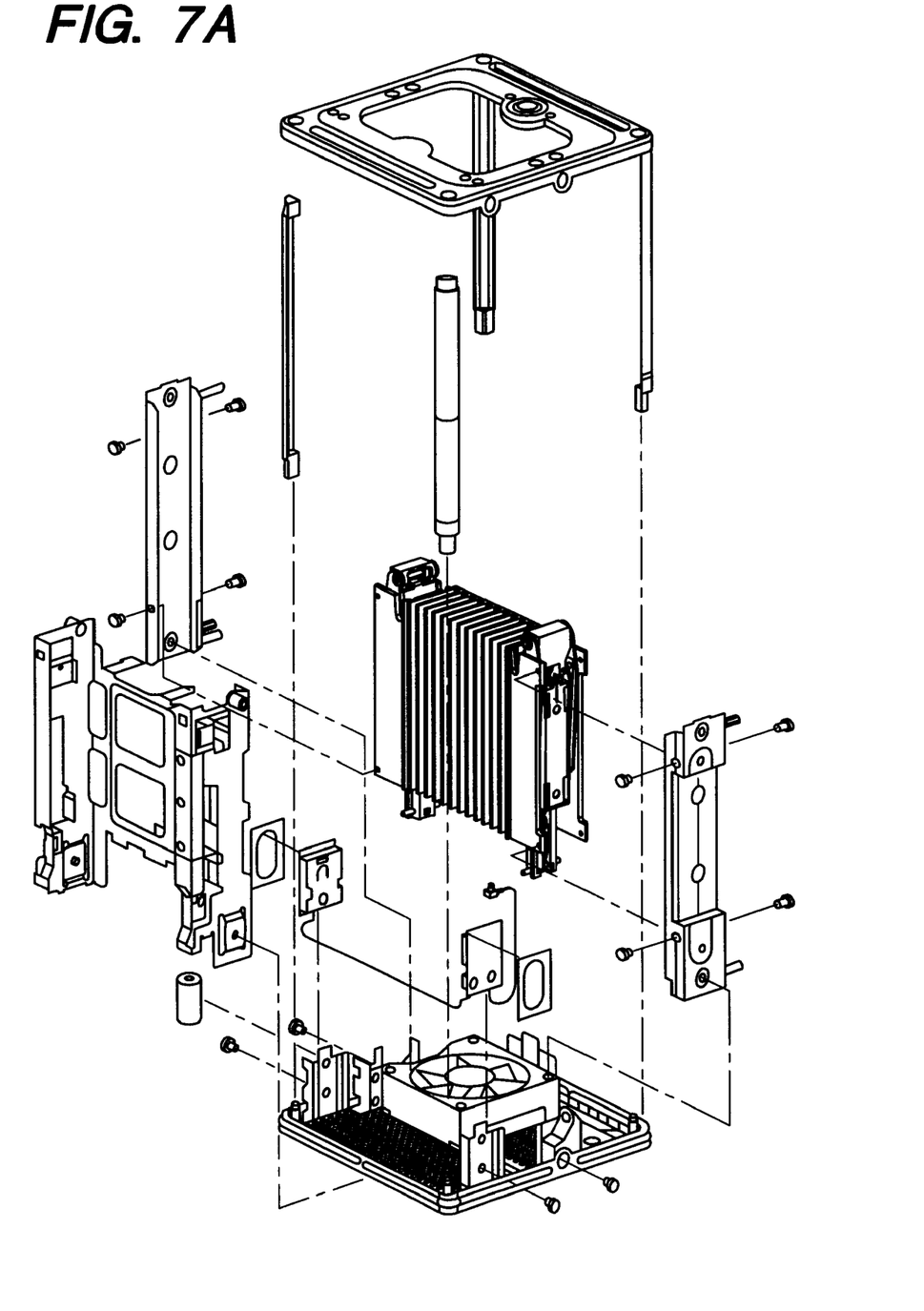
FIGS. 7A–7C are exploded, perspective views of portions of the computer system of FIG. 1, illustrating a portion of a handle mechanism according to the present invention.
Figure 7B:
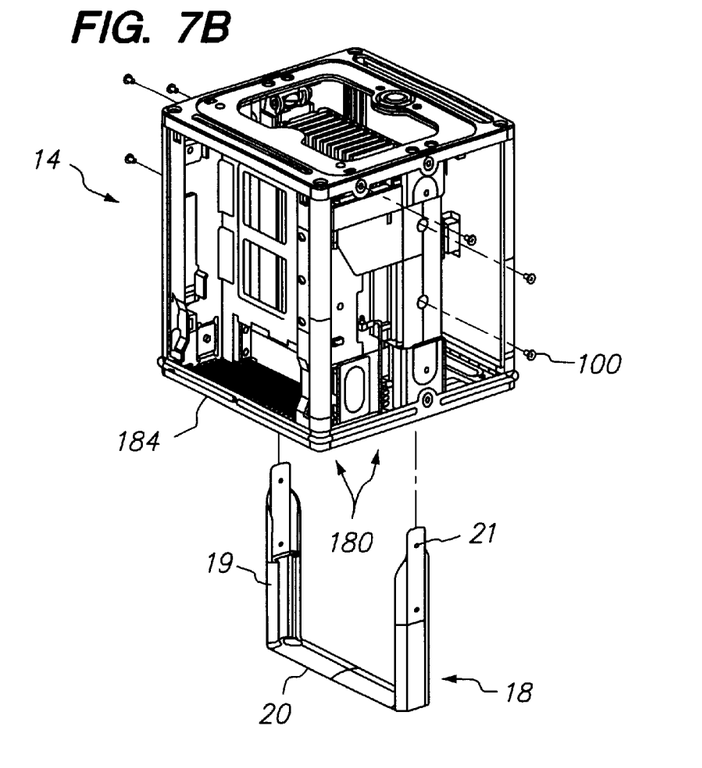
Figure 7C:
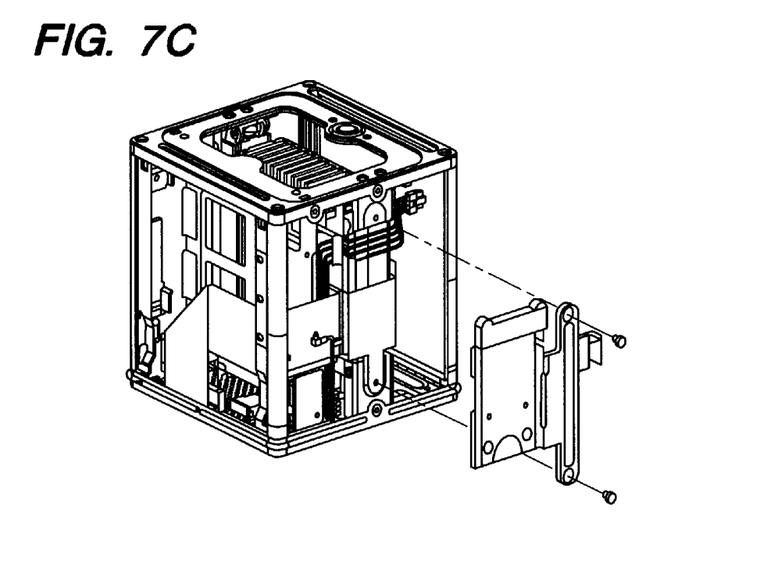
Figure 8:
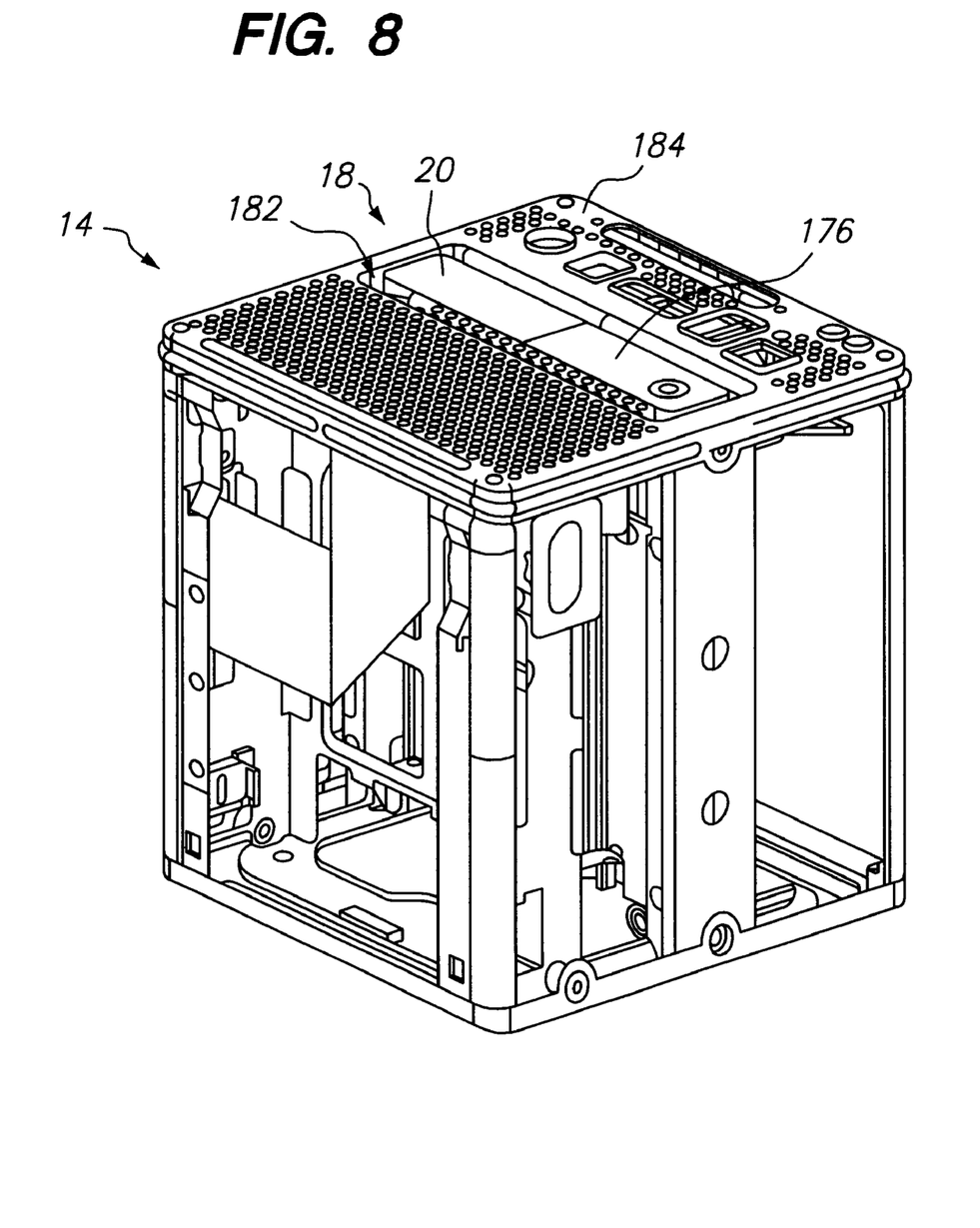
FIG. 8 is a perspective view of the core of the computer system of FIG. 1.

Referring now to FIGS. 2A and 5, the latch slider assembly 26 is preferably designed to interface with the latch rail 22 and latch pawl 24. The latch slider assembly 26 has a first end 106 and a second end 108. The latch slider assembly 26 also includes a center element 110 and two side elements 112. These three elements 110, 112 are preferably arranged to form an open center column 114. A latch damper 40 is preferably attached to the center element 110 of the latch slider assembly 26. A preferred method of attachment is to heatstake the latch damper 40 to the center element 110 within the open center column 114. A latch damper gear 42 is designed to fit on a portion 116 of the latch damper 40 that is rotatable. The latch damper 40 is preferably filled with grease, so that the speed at which the latch damper gear 42 rotates is regulated.

The side elements 112 of the latch slider assembly 26 are configured to be compatible with the latch rail 22. Each side element 112 includes a slot 118 which engages the rail 84 of the latch rail 22. The rail slots 118 are preferably formed by two tabs 120 and two shelves 122 extending from each side element 112 into the open center column 114. Each side element 112 preferably has a tab 120 and shelf 122 combination near the first and second ends 106, 108 of the latch slider assembly 26. The rails 84 of the latch rail 22 are designed to fit in the space between the tabs 120 and shelves 122 of the latch slider assembly 26.

The latch slider assembly 26 is configured so that the gear teeth 88 of the track 86 of the latch rail 22 can engage the latch damper gear 42. The latch slider assembly 26 is thereby to slides smoothly over the track 86.

The latch slider assembly 26 preferably has two openings 124 in the center element 110 thereof. Two inserts 44, or other similar fittings, are installed into the two openings 124 in the center element 110. The inserts 44 are preferably brass and have threaded interior portions 126. The openings 124 and inserts 44 are aligned on the latch slider assembly 26 to correspond to openings 21 in the handle mechanism 18.

The latch slider assembly 26 also has a slot 128 in the center element 110 near the first end 106 of latch slider assembly 26. The slot 128 is configured to accept the latch wireform 28. The latch wireform 28 is preferably a generally stiff metal wire with a first portion 130 and a second portion 132. The first portion 130 of the latch wireform 28 is preferably a bent section 134 of the wire, having the end 136 thereof extending out and being bent upwards toward the second portion 132 of the latch wireform 28, thereby defining an L-shaped end. The second portion 132 of the latch wireform 28 is preferably a generally straight section 135 of wire with only the end 138 thereof being bent to the side opposite from the bent end 136 of the first portion 130 of the latch wireform 28. The end 138 of the second portion 132 of the latch wireform 28 is preferably designed to fit into the housing 52 of the latch rail 22 to control the latch and release of the handle mechanism 18.

The slot 128 of the latch slider assembly 26 preferably houses the first portion 130 of the latch wireform 28. The end 136 of the first portion 130 of the latch wireform 28 preferably fits through the slot 128 and extends into the open center column 114 of the latch slider assembly 26. When the latch wireform 28 is held within the latch slider assembly 26, the end 136 of the first portion 130 extends into the open center column 114, and preferably extends toward the first end 106 of the latch slider assembly 26 so that a second end loop 94 of the latch extension spring 30 can be held in place by that end 136 of the latch wireform 28.

The side elements 112 of the latch slider assembly 26 are greater in length than the center element 110 at the first end 106 of the latch slider assembly 26. The extensions 140 are preferably triangular-shaped and have prongs 142 that extend out from the side elements 112 of the latch slider assembly 26. The prongs 142 of the latch slider assembly 26 preferably interface with the latch pawl 24.

As shown in FIG. 2A, the latch pawl 24 is designed to interact with the latch rail 22, the latch slider assembly 26, and the latch bracket 46. The latch pawl 24 is preferably made of metal, although other materials could, of course, also be used. The latch pawl 24 has a first end portion 144 and a second end portion 146. The latch pawl 24 also has a center section 148 and two side sections 150. The center section 148 of the latch pawl 24 preferably has a latching edge 152 which is configured for engagement with the latch bracket 46 to latch the core unit 14 to the casing 12. The center section 148 of the latch pawl 24 also preferably has a protrusion 154, opposite the latching edge 152, that extends into the area between the two side sections 150.

The side sections 150 of the latch pawl 24 may extend beyond the center section 148 at a first end portion 144 of the latch pawl 24. These side section extensions 156 are generally rounded, and preferably have aligned openings 160 to fit the pivot pin 34 and attach the latch pawl 24 to the housing 52 of the latch rail 22.

The side sections 150 of the latch pawl 24, also preferably extend beyond the center section 148 at a second end portion 146 of the latch pawl 24. These side section extensions 158 are preferably longer than the extensions 156 of the first end portion 144, and preferably have elongated, aligned openings 162 compatible with the prongs 142 of the latch slider assembly 26. The elongated aligned openings 162 of the latch pawl 24 preferably fit over the prongs 142 on each side of the latch slider assembly 26. The latch torsion spring 32 preferably biases the latch pawl 24 toward a latched configuration with the latch bracket 46. The elongated aligned openings 162 are designed so that the sliding motion of the latch slider assembly 26 will cause the latch pawl 24 to rotate between a first latching position 164 and a second releasing position 166 with respect to the latch bracket 46.

Referring to FIGS. 6A–6F, the latch bracket 46 is designed to be compatible with the casing 12 and the latch pawls 24 to secure the core unit 14 into the casing 12. The latch bracket 46 is preferably made of metal although other materials could, of course, be used. The latch bracket 46 has a base 168 and two bracket extensions 170. The base 168 is preferably square-shaped with an open center area. The base 168 of the latch bracket 46 is secured to the top, inside portion of the casing 12 with screws 100.

The bracket extensions 170 extend into the casing 12. The bracket extensions 170 are preferably rectangular-shaped with an open center area. The bracket extensions 170 are configured for engagement with the latch pawl 24 and the latch rail 22. Each bracket extension 170 may have a first portion 172 offset slightly from a second portion 174 so as to better fit the shape of the latch pawl 24 and latch rail 22 in the locations where they are adjacent to the bracket extension 170. The bracket extensions 170 preferably align with the latching edge 152 of the center section 148 of the latch pawl 24 to hold the core unit 14 in the casing 12 while in a latched position 164.

Referring also to FIGS. 7A–7C and 8, the handle mechanism 18 is designed to fit into the casing 12 and attach to the latch slider assembly 26. The handle mechanism 18 includes a hand grip 20 and two side portions 19. The side portions 19 preferably slide into the core unit 14 and are attached to the latch slider assembly 26. In this regard, the side portions 19 may have openings 21 aligned with the inserts 44 of the latch slider assembly 26. The handle mechanism 18 may also be joined to the latch slider assembly 26 with screws 100. The handle mechanism 18 cooperates with the latching system 16 such that having the handle mechanism 18 in a first inserted position 176 secures the core unit 14 into the casing 12, and having the handle mechanism 18 in a second extended position 178 releases the core unit 14 from the casing 12, such that the core unit 14 can then be lifted from the casing 12 using the extended handle mechanism 18.

The core unit 14 is preferably designed with openings 180 for receiving the side portions 19 of the handle mechanism 18, as well as a recessed portion 182 so that in the latched position 176, the hand grip 20 will preferably sit in the recessed portion 182 and be flush with the exterior surface 184 of the core unit 14. The core unit 14 is thus designed to support elements of the latching system 16.

The latching system 16 is arranged to latch the core unit 14 of the computer 10 to the computer casing 12. The latch pawl 24 is attached to the latch rail 22 by inserting the pivot pin 34 though openings 160 in the first end portion 144 of the latch pawl 24, through the latch torsion spring 32, and through the openings 54 in the housing 52 of the latch rail 22, and the pivot pin 34 being held in place by the E-clip 36. The latch slider assembly 26 preferably slides on to the latch rail 22. The latch extension spring 30 is placed in the open center column 82 of the latch rail 22 below the latch slider assembly 26. The latch slider assembly 26 is then backed down along the latch rail 22 until the wireform slot 128 aligns with the top loop 92 of the latch extension spring 30. The latch wireform 28 is placed through the slot 128 in the latch slider assembly 26, capturing the top loop 92 of the latch extension spring 30. The latch wireform 28 may be secured to the latch slider assembly 26 with adhesive or any other securing means as known in the art. The latch pawl 24 is preferably swung back and the elongated aligned openings 162 in the sides 150 of the second end portion 158 of the latch pawl 24 engage the prongs 142 of the latch slider assembly 26. The latching system 16 is secured to the structure 102 of the core unit 14, by lowering the latch slider assembly 26, and inserting screws 100 through the openings 98 in the back portion 80 of the shaft 76 of the latch rail 22, and into the structure 102 adapted to be secured in the core unit 14. The latch slider assembly 26 is adjusted so that the lower loop 94 of the latch extension spring 30 can be pulled and engaged over the rail hook 90 in the shaft 76 of the latch rail 22. The slider pin 38 is placed through the aligned openings 96 in the side portions 78 of the shaft 76 near the bottom of the latch rail 22. The latching system 16 is thus incorporated into the core unit 14 along with various other elements of the computer system 10. The handle mechanism 18 may be inserted into the core unit 14 and attached to the latch slider assembly 26 with screws 100, which preferably pass through the openings 21 in the handle mechanism 18 and into the inserts 44 of the latch slider assembly 26. Any additional elements of the computer system 10 can also be added and secured in the core unit 14. The latch bracket 46 is secured to the inside of the casing 12.

To install the computer core unit 14 into the casing 12, the computer core unit 14 is lifted by the handle mechanism 18 and gently placed into its position within the casing 12. The handle mechanism 18 is then pressed down into the computer core unit 14 until the latching system 16 secures the computer core unit 14 to the casing 12. As the handle mechanism 18 is pressed down, the latch slider assembly 26, and the latch wireform 28, slide toward the housing 52 of the latch rail 22. Additionally, as the latch slider assembly 26 slides, the latch pawl 24 will rotate due to the movement of the prongs 142 of the latch slider assembly 26 and the bias of the latch torsion spring 32. The latch wireform 28 also enters the housing 52 on the first side 72 of the heart-shaped holding element 58. The lower portion 63 of the heart-shaped holding element 58 directs the latch wireform 28 into the first upper portion 66 of the V-shaped groove 64. When the pushing on the handle mechanism 18 stops, the latch extension spring 30 pulls the latch wireform 28 into the bottom 70 of the V-shaped groove 64, which thereby secures the handle mechanism 18 inside the core unit 14. As the latch wireform 28 reaches the housing 52, the latch pawl 24 rotates so that the latching edge 152 of the center section 148 of the latch pawl 24 engages the bracket extension 170 of the latch bracket 46 to secure the core unit 14 to the casing 12. The handle mechanism 18 of the present invention is thus integrated into the computer system 10 such that when it is not used to lift the computer core unit 14, it is stored within the computer core unit 14 and the casing 12. With the handle mechanism 18 hidden away, the computer core unit 14 is securely fastened to the casing 12.

To remove the computer core unit 14 from the casing 12, the hand grip 20 of the handle mechanism 18 is pressed toward the computer core unit 14. Pressing the hand grip 20 releases the latching system 16 and the handle mechanism 18 automatically rises out of the computer core unit 14 with a controlled dampened movement. Pressing on the hand grip 20 pushes the latch wireform 28 toward the second upper portion 68 of the V-shaped groove 64, where the latch wireform 28 preferably leaves the V-shaped groove 64 and falls onto the unraised portion of the housing 52 on the second side 74 of the side of the heart-shaped holding element 58, thereby releasing the handle mechanism 18 from the housing 52. When the push on the handle mechanism 18 stops, and the latch extension spring 30 pulls the latch slider assembly 26 along the track 86 and rails 84 of the latch rail 22. The latch slider assembly 26 preferably dampens the motion of the handle mechanism 18 through the interaction of the track 86 and the latch damper gear 42. The handle mechanism 18 then rises out of the core unit 14 with a controlled, dampened motion. As the handle mechanism 18 rises, the prongs 142 of the latch slider assembly 26 cause the latch pawl 24 to rotate away from the latch bracket extension 170, thereby unlatching the core unit 14 from the casing 12. Once the handle mechanism 18 is extended out of the computer core unit 14, it can then be used to lift and remove the computer core unit 14 out of the casing 12, thereby providing easy access to the internal computer components for repair, replacement, or the like.

While the invention has been described in detail with reference to preferred embodiments thereof, it will be apparent to one skilled in the art that various changes can be made, and equivalents employed, without departing from the scope of the invention, which is to be limited only by the claims appended hereto.

What is claimed is:

1. A computer system comprising:
   a casing enclosing a computer core unit; and
   a latching system including a handle mechanism for removably securing said computer core unit within said casing, a latching mechanism including a latch rail, a latch slider assembly connected to a first end of the latch rail, and a latch pawl rotatably attached to a second end of the latch rail;
   wherein said handle mechanism is movable between a first position for securing said core unit into said casing and a second position for removing said core unit from said casing.

2. A computer system in accordance with claim 1, wherein said latching system further comprises a latch bracket to which the latch pawl is mounted.

3. A computer system in accordance with claim 1, wherein said latch rail includes a shaft defining an open center column.

4. A computer system in accordance with claim 1, wherein said latch rail includes a track defined by gear teeth.

5. A computer system in accordance with claim 4, wherein the latch slider assembly includes a latch damper, the latch damper being engaged by the gear teeth of the latch rail track.

6. A computer system in accordance with claim 1, wherein said latching system further comprises a latch damper assembly for controlling movement of the latch slider assembly relative to the latch rail.

7. A computer system in accordance with claim 6, wherein said latch damper assembly includes a latch damper gear disposed within a latch slider assembly and a track defined by gear teeth within a latch rail.

8. A computer system in accordance with claim 1, wherein said handle mechanism first position is defined by said handle mechanism being disposed generally within said casing, an outermost surface of said handle mechanism being generally flush with an outer surface of said casing.

9. A computer system in accordance with claim 8, wherein said handle mechanism second position is defined by said handle mechanism being disposed generally extended from said casing, an outermost surface of said handle mechanism being extended outward from the outer surface of said casing for grasping by a user.

10. A method for unlatching and removing a core unit from a casing, comprising the steps of:
    deploying a handle mechanism by depressing the handle mechanism into the core unit until the handle mechanism unlatches and allowing the handle mechanism to deploy;
    releasing the core unit from the casing; and
    lifting the core unit from the casing using the handle mechanism.

11. The method of claim 10, wherein said deploying step further comprises moving the handle mechanism to an extended position spaced from the casing.

12. The method of claim 11, wherein the handle mechanism includes a hand grip portion, said lifting step includes grasping the hand grip portion.

13. A method for inserting and removing a computer core unit from a computer casing, the method comprising the steps of:
    placing the core unit having a latching system into the casing using a handle mechanism;
    depressing the handle mechanism into the core unit until the latching system secures the core unit into the casing;
    pressing the handle mechanism into the core unit until the handle mechanism unlatches from the latching system;
    allowing the handle mechanism to deploy; and
    removing the core unit from the casing.

14. The method according to claim 13, further comprising applying a force to a hand grip portion of the handle mechanism to position the handle mechanism generally flush with an outer surface of the casing.

15. The method according to claim 13, wherein the latching system and the handle mechanism automatically rises out of the computer core unit with a controlled dampened movement.

* * * * *